United States Patent [19]
Askman et al.

[11] Patent Number: 5,601,862
[45] Date of Patent: Feb. 11, 1997

[54] PROCESS FOR LAYERING STRIPS OF FOOD MATERIAL

[75] Inventors: Lars Askman, Billesholm; Anders B. Ganrot, Bjuv; Werner Leonhardt, Astorp, all of Sweden

[73] Assignee: Nestec S.A., Vevey, Switzerland

[21] Appl. No.: 593,847

[22] Filed: Jan. 30, 1996

Related U.S. Application Data

[62] Division of Ser. No. 287,181, Aug. 8, 1994, Pat. No. 5,509,350.

[30] Foreign Application Priority Data

Sep. 3, 1993 [EP] European Pat. Off. ............ 93114125

[51] Int. Cl.⁶ ............................................. A21D 6/00
[52] U.S. Cl. ...................... 426/502; 426/275; 426/297; 426/517
[58] Field of Search .................... 426/502, 517, 426/297, 557, 275, 302; 99/353, 450.2

[56] References Cited

U.S. PATENT DOCUMENTS

| | | | |
|---|---|---|---|
| Re. 33,433 | 11/1990 | Codino | 99/353 |
| 3,670,665 | 6/1972 | Levi | 426/502 |
| 4,091,721 | 5/1978 | Cosmi | 99/353 |
| 4,418,085 | 11/1983 | Becquelet | 426/502 |
| 4,899,650 | 2/1990 | Larsen | 99/353 |
| 4,992,285 | 2/1991 | Larsen | 426/502 |
| 5,077,072 | 12/1991 | Sieradzki | 426/523 |
| 5,129,315 | 7/1992 | Burwell et al. | 99/450.1 |
| 5,216,949 | 6/1993 | Bertozzi | 99/483 |

*Primary Examiner*—George Yeung
*Attorney, Agent, or Firm*—Vogt & O'Donnell, LLP

[57] ABSTRACT

A layered food product is prepared with strips of flexible food material wherein one of a plurality of previously formed strips is guided onto a first advancing conveyor belt and transported on the belt, and a second strip is guided onto a second advancing conveyor belt and transported on then off of that belt and then guided so that the off-transported strip is guided to lie over and advance with the first strip transported on the first advancing belt to form a layered product which is transported on the first advancing belt. A filling may be deposited upon the first transported strip prior to guiding the second strip to lie over the first strip, and further strips may be guided onto further belts and transported and guided sequentially to lie over the layered product to form a further layered product, and a filling again may be deposited so that the filling is present between each of the strips.

14 Claims, 2 Drawing Sheets

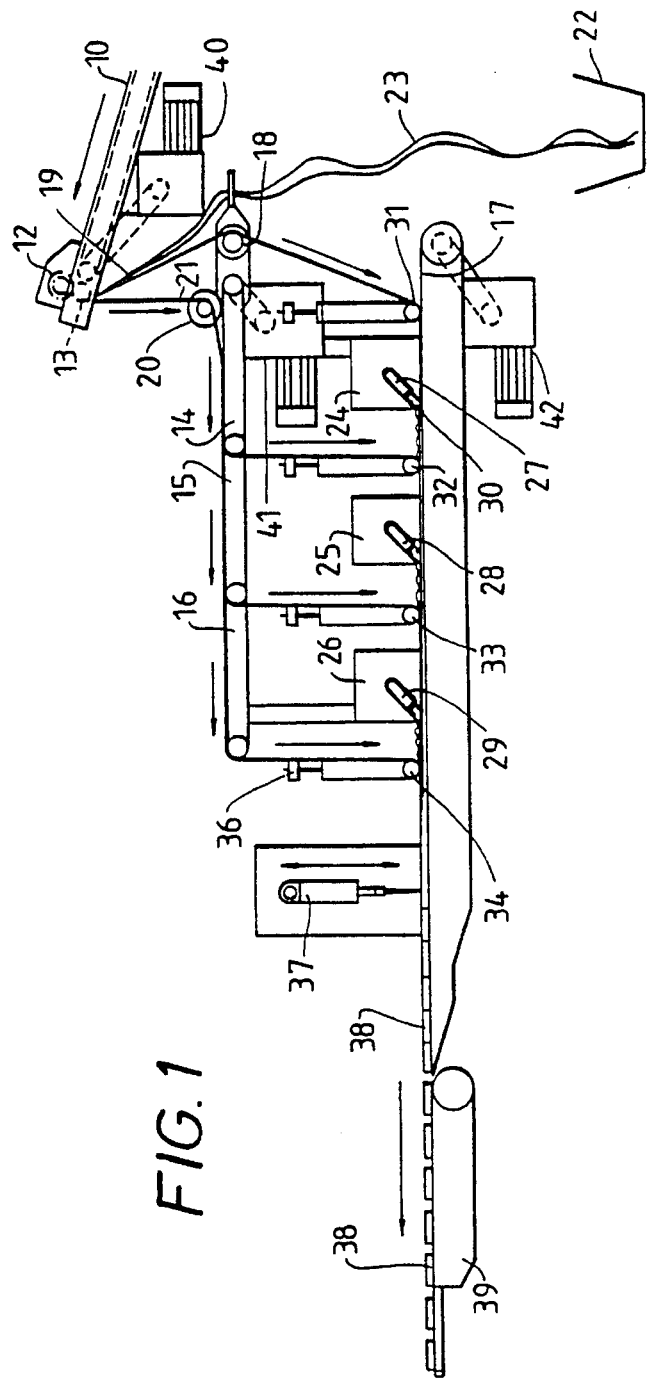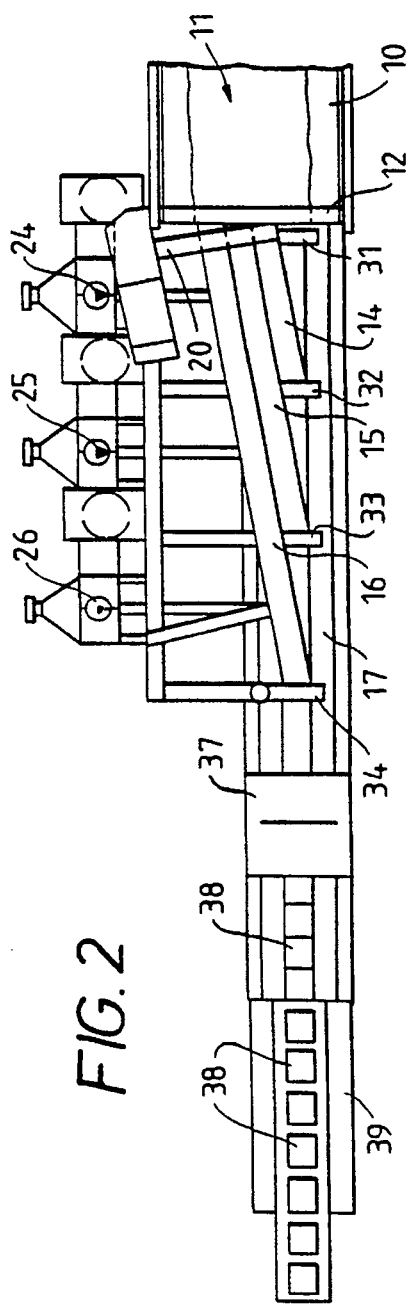

PROCESS FOR LAYERING STRIPS OF FOOD MATERIAL

CROSS REFERENCE TO RELATED APPLICATION

This application is a divisional application of application Ser. No. 08/287,181, filed Aug. 8, 1994, now U.S. Pat. No. 5,509,350.

BACKGROUND OF THE INVENTION

The present invention relates to layering of strips of food material, particularly to production of lasagne.

Normally, in the production of lasagne, the pasta is extruded, cut into strips of a suitable width, blanched, cut, and placed piece-by-piece into a tray by hand with a filling of sauce between the pieces. This process has the following disadvantages:

1) The pasta processing line is unduly long and occupies a great deal of space.

2) The process is labour intensive and requires at least five people on the line.

3) The pasta is extremely slippery and difficult to handle.

4) There are losses of pasta as a result of a lack of time for the operator to transport all the pieces of pasta to the tray.

5) There are several moving parts in the machine for transporting and layering the pasta strips, which are prone to break down or wear out.

SUMMARY OF THE INVENTION

The present invention provides a process for layering of strips of food material performable with apparatus which occupies less than half the length of a conventional processing line, is labour saving and substantially prevents any losses in pasta.

According to the present invention, there is provided a process for layering strips of food material comprising:

forming a plurality of parallel strips of flexible food material;

advancing a first conveyor belt, herein also the "lower conveyor belt" guiding one of the plurality of strips onto the advancing belt to obtain a first strip on the first advancing belt and transporting the first strip on the first advancing belt;

advancing a second conveyor belt, herein also the "upper conveyor belt" at a position above the first advancing belt, guiding a second strip of the plurality of strips onto the second advancing belt and transporting the second strip on and then off of the second advancing belt and guiding the off-transported second strip so that the off-transported second strip is guided to lie over and advance with the first strip transported on the first advancing belt to form a layered product transported on the first advancing belt.

A plurality of further strips may be guided onto a plurality of further conveyor belts, herein also "upper conveyor belts", in a one-to-one relation, and each of the further strips is transported on and then off of the further conveyor belts and guided so that the further strips are guided to lie one over another over the transported layered product.

For carrying out the process of the invention, there is provided apparatus comprising:

a) means for forming a plurality of parallel strips of flexible food material, b) a first conveyor belt, and at least one further conveyor belt extending to a downstream end overlying the lower conveyor belt, c) a first guiding means for guiding one strip of flexible food material for delivery onto the first conveyor belt and for guiding the further strip or strips of the plurality of strips for delivery onto the further conveyor belt or belts, d) power means adapted to advance the conveyor belts for transporting the strips downstream, and e) a product-forming strip guiding means for guiding a strip of flexible food material transported from the downstream end of a further conveyor belt so that the strip is deposited to lie above another strip transported downstream by the first conveyor belt thereby forming a food product comprising layered strips of food material.

DETAILED DESCRIPTION OF THE INVENTION

In accordance with the present invention, the strips of flexible food material employed may be, for instance, strips of pasta which may be formed by any conventional means, e.g., where the pasta dough is extruded from a kneader/sheeter to give a strand which is passed onto a conveyor belt which transports the strand through a blanching tank containing hot water and then out of the blanching tank onto a conveyor.

Advantageously, the conveyor which transports the blanched pasta may conveniently be a cooling conveyor belt, and one or more cutting devices, e.g. rotating circular knives, adapted to cut the pasta strand longitudinally into a plurality of strips lying side by side, is/are positioned above the conveyor. The usual number of strips cut is from three to six for a lasagne, but a larger number of strips may be used for some products, e.g. up to 11.

The number of upper conveyor belts is conveniently the same as the number of strips which is intended to lie over the strip lying on the lower conveyor, i.e., one less than the total number of strips forming the layers of the food product. When there are a plurality of upper conveyors, they are advantageously positioned parallel to one another and have different lengths, so that the layering is a sequential operation in that the shortest one transports and delivers a strip for deposit onto the first strip lying on the lower conveyor belt, the next shortest transports and delivers a further strip for deposit onto the strip which has been deposited from the shortest upper conveyor belt, and so on, sequentially, until the longest upper conveyor belt transports and delivers the strip which is deposited to form the top layer of the food product.

The guiding means to guide the strips of flexible food material for delivery onto the lower and upper conveyor belts, respectively, may conveniently be rollers around which the strips are trained.

The power means adapted to advance the conveyor belts for transport of the strips downstream may be any conventional means, e.g. an electric motor. Although one motor may be used to drive all the belts, it is preferable that separate motors are used to drive the cooling conveyor, the upper conveyor and the lower conveyor belts because it is desirable that the speed of each conveyor is individually adjustable. Although the conveyors travel at approximately the same speed, there is normally a slight speed increase from the cooling conveyor to the upper conveyor and from the upper conveyor to the lower conveyor.

The product-forming strip guiding means, which guides a strip of flexible food material delivered from the downstream end of an upper conveyor belt so that the strip is deposited to lie above another strip advancing downstream on the lower conveyor belt to form the layered product, may suitably be a roller around which the strip is trained.

Advantageously, means are provided for depositing a filling between the layers of the food product. Such means may be provided by a filling nozzle positioned upstream of the product-forming strip guiding means. For a product having more than one or two layers of strips with a filling between each layer, there are conveniently a plurality of filling nozzles arranged successively, the number of nozzles corresponding to the number of layers of filling. Particularly when a filling is deposited, the product-forming strip guiding means suitably may be a calibrating roller around which the strip is trained and which is positioned and adjustable to control the thickness of the filling.

The filling may be, for instance, a sauce or other conventional filling for a lasagne, e.g. using a meat, fish, vegetable or meat base.

Preferably, a cutting means is provided for cutting the food product transversely to its direction of travel and is advantageously situated above the lower conveyor downstream of the position where the top layer has been deposited onto the food product.

The present invention may be fully automated and may be synchronized and electronically controlled by a computer.

The present invention is illustrated further by way of example with reference to the accompanying drawings.

BRIEF DESCRIPTION OF THE DRAWINGS

FIG. 1 is a diagrammatic side view of a lasagne producing machine according to the present invention.

FIG. 2 is a top plan view of the machine shown in FIG. 1.

DETAILED DESCRIPTION OF THE DRAWINGS

Figure 3:
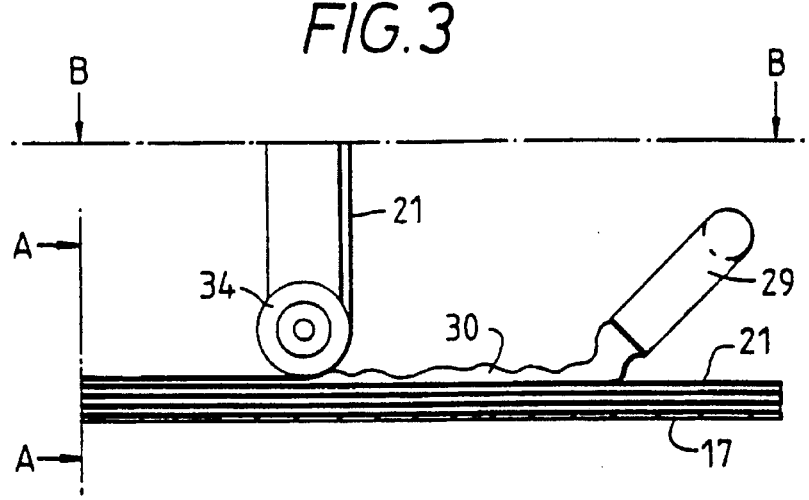
FIG. 3 is a side view of a guiding roller for a pasta strip and a filling nozzle.
Figure 4:
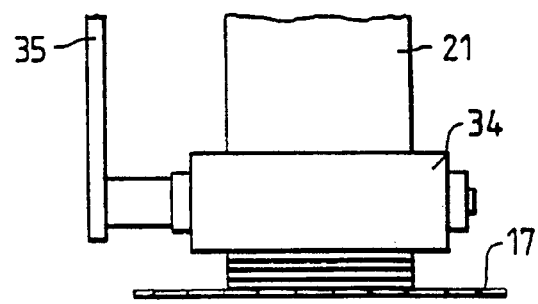
FIG. 4 is a section along the line A—A of FIG. 3 looking in the direction of the arrows.
Figure 5:
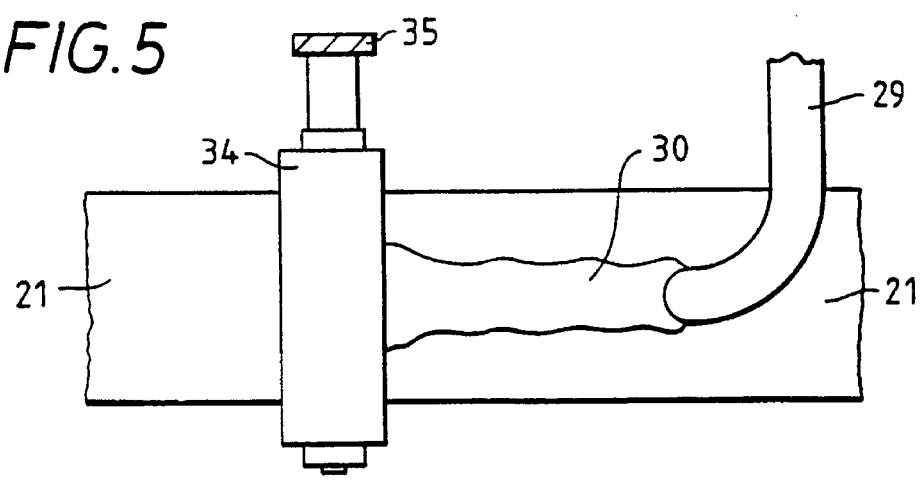
FIG. 5 is a section along the line B—B of FIG. 3 looking in the direction of the arrows.

Referring to the drawings, the machine comprises a cooling conveyor 10 transporting a pasta strand 11. At the downstream end of the cooling conveyor 10 are five rotary cutting knives 12 and a guide roller 13. Below the guide roller 13 are three upper, cross conveyor belts 14, 15 and 16, and a lower conveyor belt 17, the lower conveyor belt having a first, upstream end at a position intermediate of the strip-forming means, knives 12, and its second, downstream end. A guide roller 18 is provided for guiding pasta strip 19 onto the lower, herein also first, conveyor belt 17, and three guide rollers 20 (one for each upper cross conveyor belt, herein also second belt 14, and herein also further belts 15 and 16) are supported on a single shaft and are provided for guiding pasta strips 21 onto the upper cross conveyor belts 14, 15 and 16. A waste bin 22 is provided for receiving scrap pasta cuttings 23.

Filling pumps 24, 25 and 26 provided with filling nozzles 27, 28 and 29 respectively supply a sauce 30. Above the lower conveyor belt are provided calibrating product-forming strip rollers 31, 32, 33 and 34, each mounted on a support 35 vertically adjustable by means of a knob 36. Downstream of the calibrating rollers is a guillotine cutter 37 for cutting the layered pasta strip into lasagnes 38, and the cutter is followed downstream by an acceleration conveyor belt 39. Three electric motors 40, 41 and 42 are provided to drive the cooling conveyor 10, the upper conveyor (comprising cross conveyors 14, 15 and 16), and the lower conveyor 17, respectively.

In operation, a blanched pasta strand 11 is transported on a cooling conveyor 10 beneath the rotary cutting knives 12 which cut the strand into four parallel strips, one of which 19 is trained around and guided by the guiding roller 18 to the lower first conveyor belt 17 where it is trained around the calibrating roller 31 at its upstream end. The other three strips 21 are trained around and guided by the guiding roller 20 to the ends of the upper, cross conveyor belts 14, 15 and 16, respectively. The upper and lower conveyors are driven in synchronisation with the cooling conveyor by a motor (not shown).

Sauce 30 is fed from the nozzle 27 onto the upper surface of the pasta strip 19 transported downstream on the lower conveyor 17. When the pasta strip 19 with the sauce on top is transported to a position below the downstream end of the upper cross conveyor 14, the pasta strip 21 transported downstream on the upper cross conveyor 14 is transported and delivered off the downstream end and is trained around the calibrating roller 32 so that it comes to lie upon the layer of sauce which has been fed onto the transported strip 19 to give a two-layered pasta product. The calibrating roller 32 adjusts the thickness of the layers with the sauce filling between.

Sauce 30 is then fed from nozzle 28 onto the upper surface of the two-layered pasta product, and when the two-layered pasta product is transported to a position beneath the downstream end of the upper cross conveyor 15, the pasta strip 21 transported on the upper conveyor 15 is transported and delivered off the downstream end and is trained around the calibrating roller 33 so that it comes to lie upon the layer of sauce which has been fed onto the upper surface of the transported two-layered pasta product to give a three-layered pasta product. The calibrating roller 33 adjusts the thickness of the layers with the sauce filling between.

Sauce 30 is then fed from nozzle 29 onto the upper surface of the three-layered pasta product, and when the three-layered pasta product is transported to a position beneath the downstream end of the upper cross conveyor 16, the pasta strip 21 transported on the upper conveyor 16 is transported and delivered off the downstream end and is trained around the calibrating roller 34 so that it comes to lie upon the layer of sauce which has been fed onto the upper surface of the transported three-layered pasta product to give a four-layered pasta product. The calibrating roller 34 adjusts the thickness of the layers with the sauce filling between.

The four-layered pasta product is then transported downstream so that it passes beneath the guillotine cutter 37 which reciprocates and cuts the four-layered pasta strip transversely into individual lasagnes 38 which are then transferred to an acceleration belt 39 which spaces them from one another for further processing.

We claim:

1. A process for layering strips of food material comprising:

forming a plurality of parallel strips of flexible food material;

advancing a first conveyor belt, guiding one of the plurality of strips onto the advancing belt to obtain a first strip on the first advancing belt and transporting the first strip on the first advancing belt;

advancing a second conveyor belt at a position above the first advancing belt, guiding a second strip of the plurality of strips onto the second advancing belt and transporting the second strip on and then off of the second advancing belt and guiding the off-transported second strip so that the off-transported second strip is guided to lie over and advance with the first strip transported on the first advancing belt to form a layered product transported on the first advancing belt.

2. A process according to claim 1 further comprising, prior to guiding the off-transported second strip to lie over the first strip for forming the layered product, depositing a filling onto the first strip transported on the first advancing belt and transporting and guiding the off-transported second strip so that the guided off-transported second strip lies over the filling and the first strip.

3. A process according to claim 2 wherein the off-transported second strip is guided for contacting the filling for adjusting and controlling a thickness of the filling.

4. A process according to claim 3 wherein the off-transported second strip is guided by a calibrating roller.

5. A process according to claim 1 wherein there are a plurality of further strips formed and there are a plurality of further conveyor belts and further comprising guiding each of the further strips onto a conveyor belt in a one-to-one relation, and transporting the further strips on and then off of the further conveyor belts and guiding the off-transported further strips so that the further strips are guided sequentially to lie one over another over the transported layered product.

6. A process according to claim 5 further comprising, prior to guiding the off-transported second strip to lie over the first transported strip for forming the layered product, depositing a filling onto the first transported strip and guiding the off-transported second strip so that the guided off-transported second strip lies over the filling and the first strip and prior to guiding each off-transported further strip sequentially to lie over the transported layered product, depositing a filling upon the transported layered product to obtain a further layered product so that filling lies between each strip of the further layered product.

7. A process according to claim 6 wherein the off-transported second and further strips are guided for contacting the filling for adjusting and controlling a thickness of the filling.

8. A process according to claim 7 wherein the off-transported second and further strips are guided by a calibrating roller.

9. A process according to claim 5 or 6 wherein there are from 1 to 4 further strips and further conveyors.

10. A process according to claim 1 or 2 further comprising cutting the layered product into individual layered articles.

11. A process according to claim 1 or 2 wherein the food material is a pasta.

12. A process according to claim 1 or 2 further comprising forming a pasta dough strand and cutting the strand for forming the plurality of parallel strips.

13. A process according to claim 12 further comprising, prior to cutting the strand, blanching the strand and then cutting the blanched strand.

14. A process according to claim 13 further comprising, prior to cutting the blanched strand, cooling the blanched strand.

* * * * *